United States Patent
Lahr et al.

(10) Patent No.: US 11,753,556 B2
(45) Date of Patent: Sep. 12, 2023

(54) OPAQUE WATER-BASED INKS

(71) Applicant: SUN CHEMICAL CORPORATION, Parsippany, NJ (US)

(72) Inventors: Alexander Lahr, Rock Hill, SC (US); Bruce Marshall, Fort Mill, SC (US)

(73) Assignee: Sun Chemical Corporation, Parsippany, NJ (US)

( * ) Notice: Subject to any disclaimer, the term of this patent is extended or adjusted under 35 U.S.C. 154(b) by 965 days.

(21) Appl. No.: 16/607,246

(22) PCT Filed: Apr. 25, 2018

(86) PCT No.: PCT/US2018/029345
§ 371 (c)(1),
(2) Date: Oct. 22, 2019

(87) PCT Pub. No.: WO2018/200665
PCT Pub. Date: Nov. 1, 2018

(65) Prior Publication Data
US 2020/0299529 A1    Sep. 24, 2020

Related U.S. Application Data

(60) Provisional application No. 62/491,590, filed on Apr. 28, 2017.

(51) Int. Cl.
| | | |
|---|---|---|
| *C09D 11/00* | (2014.01) | |
| *C09D 11/10* | (2014.01) | |
| *B41M 1/10* | (2006.01) | |
| *C08K 3/22* | (2006.01) | |
| *C08K 3/30* | (2006.01) | |
| *C08K 5/00* | (2006.01) | |
| *C08K 5/01* | (2006.01) | |
| *C08L 33/08* | (2006.01) | |
| *C09D 11/037* | (2014.01) | |
| *C09D 1/00* | (2006.01) | |
| *C09D 4/00* | (2006.01) | |
| *C09D 5/00* | (2006.01) | |

(52) U.S. Cl.
CPC .............. *C09D 11/10* (2013.01); *B41M 1/10* (2013.01); *C08K 3/22* (2013.01); *C08K 3/30* (2013.01); *C08K 5/0025* (2013.01); *C08K 5/0041* (2013.01); *C08K 5/01* (2013.01); *C08L 33/08* (2013.01); *C09D 11/037* (2013.01); *C08K 2003/2241* (2013.01); *C08K 2003/3036* (2013.01); *C08L 2201/52* (2013.01); *C08L 2205/20* (2013.01)

(58) Field of Classification Search
CPC .......... C08K 3/22; C08K 3/30; C08K 5/0025; C08K 5/0041; C08K 5/01; C08K 2003/2241; C09D 11/10; C09D 11/37; B41M 1/10; C08L 33/08; C08L 2201/52; C08L 2205/20
USPC ................................ 106/31.01, 31.13, 31.6
See application file for complete search history.

(56) References Cited

U.S. PATENT DOCUMENTS

| | | | |
|---|---|---|---|
| 5,147,940 A | 9/1992 | Biale | |
| 6,309,452 B1 * | 10/2001 | Beach | B41M 5/0023 106/31.27 |
| 2004/0241352 A1 | 12/2004 | Shih et al. | |
| 2005/0107492 A1 | 5/2005 | Sukhna | |
| 2007/0203259 A1 * | 8/2007 | Kurihara | C09D 11/17 401/209 |
| 2010/0039463 A1 * | 2/2010 | Van Thillo | B41J 2/17503 347/100 |
| 2011/0293508 A1 | 12/2011 | Hofmann et al. | |
| 2013/0225748 A1 | 8/2013 | Jakubek | |
| 2017/0293056 A1 * | 10/2017 | Chen-Ho | G02B 5/128 |

FOREIGN PATENT DOCUMENTS

| | | | | |
|---|---|---|---|---|
| EP | 1371679 A1 * | 12/2003 | ............. | A01N 25/10 |
| EP | 1 632 537 A1 | 3/2006 | | |
| EP | 1 904 581 B1 | 4/2013 | | |
| EP | 2 930 266 A1 | 10/2015 | | |

OTHER PUBLICATIONS

Supplementary Partial European Search Report issued in European Application No. EP 18 79 2198, dated Dec. 10, 2020.
International Search Report issued in International Application No. PCT/2018/029345, dated Jul. 9, 2018.
Written Opinion of the International Searching Authority issued in International Application No. PCT/2018/029345, dated Jul. 9, 2018.
International Preliminary Report on Patentability (Chapter II of the Patent Cooperation Treaty) issued in International Application No. PCT/2018/029345, dated May 15, 2019.

* cited by examiner

*Primary Examiner* — James E McDonough
(74) *Attorney, Agent, or Firm* — Marian E. Fundytus; Ostrolenk Faber LLP.

(57) ABSTRACT

Described herein are opaque water-based inks that include water and an opacity-providing polymer component. In one aspect, the opacity providing polymer component is a hollow sphere polymer material. The opacity-providing polymer material may replace all or part of white opacifying pigment material, such as titanium dioxide. Also described herein is a method of opacifying a printing ink by adding hollow sphere resin particles and a colorant to a printing ink that comprises water as a volatile component.

15 Claims, No Drawings

OPAQUE WATER-BASED INKS

The present application is a U.S. National Stage application filed under 35 U.S.C. § 371, which is based on PCT/US2018/029345 filed Apr. 25, 2018, which claims priority to U.S. Provisional Application No. 62/491,590 filed Apr. 28, 2017, the subject matter of each of which is incorporated by reference in their entirety.

FIELD OF THE INVENTION

The inventions disclosed herein are directed to the field of printing inks and coatings, in particular inks and coatings for providing an opaque finish to the printed material. The inks can be printed by any number of printing techniques, such as flexo, gravure, lithographic, screen printing, digital printing, among others.

BACKGROUND OF THE INVENTION

State of the art opaque ink formulations include white pigment material, which provides the opaque appearance and property of the ink. Such white pigment materials include, for example, titanium dioxide ($TiO_2$) and zinc sulfide (ZnS). Opaque ink formulations that include with these pigments provide opacity sufficient to obscure, hide and/or cover underlying ink layers and/or the substrate on which the opaque inks are printed. Opaque inks are also used for purpose of enhancing the appearance of an ink printed on top of the opaque inks. For example, a colored ink printed over an opaque ink will exhibit a brighter color and cleaner appearance.

Without including white pigment in the opaque inks, the underlying ink and/or substrate layers can show through applied ink layers, causing the opaque and subsequent ink layers to appear dark and/or dirty.

Large amounts of white pigment material are required to provide sufficient opacity. For example, an opaque white water based ink may include 50 wt % or more and even 55 wt % or more of $TiO_2$ and ZnS. The amounts of pigment material can even be up to 70 wt %. However, such white pigment materials in large amounts can cause excessive blade wear on die-cutting machines during the die-cutting operation in which the printed substrates are cut. The metal blades of die cutting machines are made of stainless or carbon steel, which have a Mohs hardness of 4.0-4.5. The rutile form of titanium dioxide has a hardness of 6.0-6.5 and the anatase variety has a hardness of 5.5-6.0. Since titanium dioxide has a hardness greater than steel, it will scratch the cutting blades. When done repetitively, such as over perhaps millions of times during the process of printing or die-cutting, the millions of scratches will eventually be observed as blade wear.

It would be advantageous to reduce or eliminate the amount of titanium dioxide in the ink and replace it with a softer material in order to reduce erosion of the blade (i.e., improve blade durability), and to provide a source of opacity other than white pigment materials such as $TiO_2$ and ZnS.

References that may be of interest include EP 2 930 266, U.S. Pat. No. 5,147,940, EP 1 904 581, and U.S. Publ. Pat. Appl. No. 2005/0107492.

SUMMARY OF THE INVENTION

Described herein are opaque water-based inks that comprise water and an opacity-providing polymer component. In one aspect, the opacity providing polymer component is a hollow sphere polymer material. The opacity-providing polymer material may replace all or part of another opacifying component, such as titanium dioxide, which is an abrasive white pigment material. Thus, the presently described inks contain reduced amounts of abrasive white pigment material, and/or the abrasive white pigment material is replaced entirely. Using these inks in printing reduces the amount of wear on the blades of die cutting machines. Thus, the amount of down time required to replace worn die blades is reduced and cost savings is realized from having to replace the blades less frequently. As an additional benefit, replacing part or all of the white pigment will lower the specific gravity of the opaque white ink and therefore provide greater ink mileage, which reduces the amount of time required for replenishing the ink in the sump and results in less ink being used.

Described herein are opaque water-based inks with high opacity that are employed in printing processes such as flexographic, gravure, lithographic, screen, and digital, among others. The opaque water-based inks comprise a hollow sphere polymer component as an opacity-providing component and water. The inks may further comprise a white pigment material selected from titanium dioxide ($TiO_2$), zinc sulfide (ZnS), and combinations thereof, as additional opacity providing components.

Also described herein is a method of opacifying a printing ink comprising adding hollow sphere resin particles and a colorant to a printing ink that comprises water as a volatile component. The colorant may be a colorant (e.g., pigment, dye) that emits color in the visible, infrared, and ultraviolet spectrum, and it may be a white colorant (e.g., pigment, dye). The colorant may be a mixture of these colorants.

In one particular aspect, the colorant is a colored pigment or dye emitting a color that is part of the visible light spectrum (red, orange yellow, green, blue, indigo, violet).

In an alternative aspect, the colorant may be a colorant (e.g., pigment, dye) that emits color in the visible, infrared, and ultraviolet spectrum and mixtures thereof. In an alternative aspect, white colorant is excluded.

The present opaque water-based inks are well-suited for printing substrates that are subsequently die-cut for use in various end-use applications, such as for example containers for the food industry such as solid unbleached substrate (SUS) board and Kraft board and bag stock. Presently, the opaque inks used for this purpose include great amounts of white pigments. Such white pigments include titanium dioxide, zinc sulfide, and mixtures thereof. As indicated, these materials are abrasive and cause wear to the die cutting blades.

Opaque water-based inks including the hollow sphere polymers can match the appearance of opaque inks that include white pigment materials such as titanium dioxide and zinc sulfide. Advantageously, removal of some or all of the white pigment material and replacement thereof with hollow sphere resins improves the durability of the blades on the die cutting machine. Applicants have found that substrates printed with the inks described herein do not wear out the die cutting blades used to cut the printed substrates at the same rate as substrates printed with the inks that include only white pigment materials (e.g., $TiO_2$, ZnS) as opacifying agents. That is, the life of a die cutting blade can be extended by cutting substrates printed with the present inks. Apparently, and without being bound by any theory, the present inks are believed to be less abrasive to the blades than inks that include only white pigment materials (e.g., $TiO_2$, ZnS)

as opacifying agents, and thus the life of a cutting blade can be extended by cutting the substrates printed with the present inks.

Among other advantages provided by the opaque water based inks described herein are:

Significantly reduced ink usage through reduction or elimination of white pigment (e.g., $TiO_2$) content;

Lower ink specific gravity and density;

Improved brightness, opacity, and ink lay, through better hiding (e.g., obscuring) of the substrate, that is, the substrate not being visible in the region where the ink is applied.

These improvements are realized in white inks and in colored inks.

DETAILED DESCRIPTION OF THE INVENTION

Described herein are opaque water-based inks with high opacity that are employed in printing processes such as flexographic, gravure, lithographic, screen, and digital, among others. The opaque water-based inks comprise a hollow sphere polymer component as an opacity-providing component and water. The inks may further comprise a white pigment material selected from titanium dioxide ($TiO_2$), zinc sulfide (ZnS), and combinations thereof, as additional opacity providing components.

Also described herein is a method of opacifying a printing ink comprising adding hollow sphere resin particles and a colorant to a printing ink that comprises water as a volatile component. The colorant may be a colorant that emits color in the visible, infrared, and ultraviolet spectrum, and it may include white materials such as white pigments and dyes. The colorant may be a colorant that emits color in the visible, infrared, and ultraviolet spectrum may be a colored pigment or dye such as a color that is part of the visible light spectrum (red, orange yellow, green, blue, indigo, violet).

In an alternative aspect, the colorant may be a colorant that emits color in the visible, infrared, and ultraviolet spectrum. In this alternative aspect, the colorant does not include white materials, such as white pigments and dyes.

The present opaque water-based inks provide opacity without the inclusion of one or more of $TiO_2$ and ZnS, or with the reduced inclusion of one or more of $TiO_2$ and ZnS. That is, some or all of the $TiO_2$ and/or ZnS is replaced with an opaque polymer in the form of a hollow sphere polymer resin.

While not wishing to be bound by any theory, it may be that when light enters a hollow sphere resin, it travels through a solid polymer shell layer into a hollow center that is empty or contains a gas, which leads to the refraction of the light at different angles, which creates the opacity of the hollow sphere resin particles. This would not be the case for a completely solid polymer material, where the degree of refraction would be much less, and thus these materials would be less opaque.

The present opaque water-based inks that comprise the opacity-providing hollow sphere polymer has been found suitable for application to substrates including, for example, foils, plastics, and non-woven materials, such a polyolefin material made to appear like a woven material. In one particular aspect, the present opaque water-based inks are effective for printing on darker substrates, such as brown paper, where use of a high opacity ink helps to hide or obscure the brown color of the paper.

As indicated, the metal blades of die cutting machines are made of steel having a Mohs hardness of 4.0-4.5, and rutile and anatase $TiO_2$ have hardness values greater than steel, which will result in scratching of the steel blades during cutting. When done millions of times during the process of printing or die-cutting, the millions of scratches will eventually be observed as blade wear. By replacing $TiO_2$ in the ink with softer hollow-sphere resin material, blade wear will be reduced.

In one aspect, the hollow sphere resin particles may be supplied as a component that comprises the particles in an aqueous solution in water comprising about 15 wt % to about 45 wt % resin and about 55 wt % to about 85 wt % water. In another embodiment, the hollow sphere resin may be supplied as a solution in water comprising about 20 wt % to about 50 wt % resin and about 50 wt % to about 80 wt % water. These amounts are based on the total weight of the component (e.g., resin particles+water).

In a preferred aspect, the commercially available Celocor® AF Opaque Polymer resin from Arkema, which are voided latex particles, is employed as the hollow sphere polymer material in the ink compositions. This product is comprised of about 30% hollow resin material and about 70% water. Other commercially available hollow sphere polymer materials the can be used in the present opaque water-based polymers include, but are not limited to Ropaque™ HP-1055, Ropaque™ HP-543, Ropaque™ Ultra, Ropaque™ AF-1055, Joncryl® 633 and Joncryl® 631 and combinations thereof. The Ropaque™ products are available from Dow Chemical Company. The Joncryl® products are available from BASF.

Hollow sphere resin particles are much less abrasive than $TiO_2$ and ZnS. Thus, a reduction in doctor blade and diecutter blade wear will result from a substitution of the presently described inks for the opaque water-based inks of the state of the art that include large amounts of $TiO_2$ and ZnS. That is, the blades will be used to cut substrates printed with the present inks that contain lesser amounts of abrasive, wear-causing materials, thereby extending blade life.

In one aspect, the predominant portion (i.e., greater than 50 wt %) of the opacity providing component of the opaque water-based compositions is the hollow sphere polymer resin described herein, in combination with a minor portion (i.e., less than 50 wt %) of the white pigment material, e.g., $TiO_2$, ZnS. In another aspect, the entire portion (i.e., 100 wt %) of the opacity providing component of the opaque water-based compositions is the hollow sphere polymer resin described herein, without including any white pigment material. In either aspect, the life of die-cutting blades would be extended, if not maximized, when cutting substrates printed with the present ink compositions. In another aspect, equal amounts of the hollow sphere polymer resin and white pigment material (i.e., each 50 wt %) are used as the opacity-providing component. In yet another aspect, the hollow sphere polymer resin described herein is a minor portion (i.e., less than 50 wt %) of the opacity-providing component, in combination with a predominant portion (i.e., greater than 50 wt %) of the white pigment material. This may provide an ink that imparts a degree of improved die-cutting blade durability, which would be advantageous in terms of limiting the down time associated with changing the die cutter blades and the costs associated therewith. These amounts are based on the total weight of the composition.

The described inks include water and/or other solvents as volatile components of the ink compositions. In one aspect the water content of the volatile component is: about 10 wt % to about 100 wt %; preferably about 20 wt % to about 100 wt %; more preferably about 30 wt % to about 100 wt %; still more preferably about 40 wt % to about 100 wt %; and yet more preferably more preferably about 50 wt % to about 100 wt %. These amounts are based on the total amount of volatile component present in the inks. Other volatile solvents that may be included in the ink compositions are, for example, alcohols, esters, aliphatic hydrocarbons, cyclic hydrocarbons, aromatic hydrocarbons, ketones, aldehydes, ethers, and mixtures thereof. For example, the additional volatile component may be one or more oxygen-containing water-tolerant component such as 1-propoxy-2-propanol, glycol ethers, n-propanol, isopropanol, ethyl alcohol, other lower alcohols, and mixtures thereof. These components, which may act as solvents for other components, can be used to adjust drying speed, coalesce emulsions, and also to control foaming. In a preferred aspect, the volatile solvent components other than water may be present in the ink compositions in an amount that is about 0 wt % to about 50 wt % of all volatiles. These amounts are based on the total weight of the composition.

In one preferred aspect, the present inks include, based on the total weight of the composition, about 1.0 wt % to about 50 wt % hollow sphere resin particles, preferably 10 wt % to about 50 wt %, more preferably 20 wt % to about 50 wt %, and more preferably 30 wt % to about 50 wt %.

Additives may be optionally included in the inks in order to improve and enhance various properties. A partial list of such additives includes, but is not limited to: adhesion promoters, silicones, light stabilizers, de-gassers, waxes, ammonia, flow promoters, crosslinkers, defoamers, antioxidants, stabilizers, surfactants, dispersants, plasticizers, rheological additives, and others.

When a wax is included in the present ink compositions, it may be an amide wax, erucamide wax, polypropylene wax, polytetrafluoroethylene wax, paraffin wax, polyethylene wax, Teflon, carnauba wax and the like.

A crosslinker, when present, may be in the form of a zinc oxide material.

The inks of the present invention may optionally contain additional polymers and resins, such as to improve resistance properties, e.g., mar and rub resistance, and/or to improve printability or adhesion. Such resins may include but are not limited to styrenated acrylics, rosinated alkyds, melamine-formaldehyde resins, urea-formaldehyde resins, polyester-urethanes and urethanes.

The inks of the present may also optionally comprise colorants, such as organic and inorganic dyes and pigments. Examples of inorganic pigments include such as Pigment White 6 (Titanium Dioxide), zinc sulfide (ZnS), Pigment Black 7 (carbon black), Pigment Black 11 (Black Iron Oxide), Pigment Red 101 (Red Iron Oxide) and Pigment Yellow 42 (Yellow Iron Oxide). Organic pigments include Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 26, Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23 and others. The dyes include azo dyes, anthraquinone dyes, xanthene dyes, azine dyes, combinations thereof and others.

The colorants may be included in the composition as water-based colorant dispersions comprising about 15 wt % to about 60% pigment, about 5 wt % to about 75 wt % resin, and about 10 wt % to about 60 wt % water. These amounts are based on the total weight of the colorant dispersion. The water based colorant dispersion may be a water based pigment dispersion that includes a water-based acrylic resin. The water-based colorant dispersion component, if present in the composition, may be present in the described ink compositions in an amount of about 1.0 wt % to about 50 wt %, based on the total weight of the composition.

The aqueous solution of the hollow sphere resin component (particles+aqueous solution) may be present in the described ink composition in an amount of about 1.0 wt % to about 90 wt %, preferably about 10 wt % to about 90 wt %, more preferably about 10 wt % to about 75 wt %, still more preferably about 20 wt % to about 90 wt %, based on the total weight of the composition.

The wax component, if present in the composition, may be present in the described ink compositions in an amount of about 0.1 wt % to about 4.0 wt %, based on the total weight of the composition. The wax component may be a polyethylene wax.

The defoamer component, if present in the composition, may be present in the described ink compositions in an amount of about 0.1 wt % to about 1.5 wt %, based on the total weight of the composition.

The silicone component, if present in the composition, may be present in the described ink compositions in an amount of about 0.01 wt % to about 0.5 wt %, based on the total weight of the composition. Commercially available silicone component that may be used include Dow Corning 51 or Dow Corning HV495/HV496.

Wax, if present in the composition, may be present in the described ink compositions in an amount of about 0.01 wt % to about 4.0 wt %, preferably about 0.5 to about 4. wt %, more preferably about 1.0 wt % to about 3.0 wt %, and more preferably about 1.5 wt % to about 3.0 wt %, based on the total weight of the composition. For example, a PTFE wax, if present in the composition, may be present in the described ink compositions in an amount of about 0.01 wt % to about 1.0 wt %, and a polypropylene wax, if present in the composition, may be present in the described ink compositions in an amount of about 0.1 wt % to about 4.0 wt %, based on the total weight of the composition.

If present, a crosslinker, such as a zinc oxide crosslinker, may be present in the described ink compositions in an amount of about 0.1 wt % to about 2.0 wt %, based on the total weight of the composition.

Urea, if present in the composition, may be present in the described ink compositions in an amount of about 0.1 wt % to about 10 wt %, based on the total weight of the composition. Urea, such as shotted urea, is an ink additive that improves resolubility in order to prevent ink build-up on printing plates which helps provide cleaner colors. Urea also acts as a lubricant.

The presently described inks can be made by adding the hollow sphere resin particle component, to water, additional solvent (if any), white pigment material (e.g., TiO2, ZnS), if any, and other colorant, if any, along with any additives, and mixing the components together for sufficient time, until the ink mixture is uniform. The components may be mixed together in a high speed mixer having a paddle blade for a duration of about 15 minutes.

EXAMPLES

The following examples illustrate specific aspects of the present invention and are not intended to limit the scope thereof in any respect and should not be so construed.

Inventive Example 1

Water-Based PMS 213 Red Based on hollow spheres.

| Material | Wt % |
|---|---|
| Celocor ® AF Opaque Polymer resin (Arkema: 30 wt % hollow spheres in 70 wt % water) | 66.8 |
| Quindo ® Dispersion (Sun Chemical: pigment dispersion in 55% water + resin) | 27.6 |
| Shotted urea | 2.0 |
| glycol ether DB (solvent) | 1.0 |
| Rhodoline 999 (Solvay: defoamer) | 0.6 |
| Joncryl Wax 4 (BASF) | 2.0 |
| Total | 100.0 |

Inventive Example 1 WB PMS 213 Red is intended to compare to Comparative Example 1, a stored color standard that includes titanium dioxide pigment, which is highly opaque and can hide brown paper stock on which it printed. Without the presence of an opacity-providing material in the ink, the brown stock will adversely affect the printed color, making it appear dark and dirty. The Inventive Example 1 WB PMS 213 Red (was matched to this stored standard having a CMC ΔE<2.0, as measured with a D50/10 illuminant. (CMC is Color Measurement Committee; ΔE is the total color difference. Here ΔE is <2.0=total color difference of less than 2.0). A spectrophotometer is used to make this measurement)

Comparative Example 1: Water-Based PMS 213 Red Based on Anatase/Rutile White Pigments

| Material | % |
|---|---|
| Anatase TiO$_2$ Dispersion (available from Sun Chemical) | 65.0 |
| Flexiverse Red 57 (Sun Chemical: pigment dispersion in 58.7% water + resin) | 18.0 |
| shotted urea (additive) | 4.0 |
| Phosflex 4 plasticizer (ICL Industrial) | 1.0 |
| Rutile TiO$_2$ Dispersion (Sun Chemical) | 12.0 |
| Total | 100.0 |

Inventive Example 2: Green Based on a Blend of Zinc Sulfide White Pigment and Joncryl 633 Hollow Spheres

| Material | % |
|---|---|
| ZnS White | 62.9 |
| Joncryl 633 (BASF: Hollow spheres in water (63% water + 37% Resin) | 10.1 |
| Aquasurf Blue 15:3 | 1.7 |
| C Series Yellow 14 | 23.0 |
| GS-1450 Green (Heubach: pigment dispersion in 51.8% water + resin) | 2.3 |
| Total | 100 |

Die-Cutting Blade Wear Tests

The inks were printed onto brown stock with a hand proofer (6.8 BCM) and dried with a heat gun for about 5 seconds.

The abrasiveness of the ink compositions of the examples was tested on a Daetwyler abrasion tester. The abrasiveness of an ink affects the life of the cutting blades present on the die-cutter. The Daetwyler abrasion tester includes a pre-made, chrome-coated disc. The disk is weighed on an analytical scale and then placed in the bottom of the testing chamber and filled with an ink sample. A cylinder containing four razor blades is placed into the chamber and attached to the testing device. The lid is placed on the chamber. The abrasion tester is then run for 4 hours and 10 minutes, with the blades scraping against the chrome-plated disk during operation. At the end of the test, the ink is poured out of the chamber and the chrome-plated disk is removed and washed. The disk is then reweighed and the amount of chrome removed during the test is determined by subtracting the final weight of the disk from the initial weight thereof. The disk is also visually inspected for scratches and other abnormal wear patterns.

The test results in Table 1 below show the amount of abrasion observed with the following ink examples:

Inventive Example 1

Water-Based PMS 213 Red Based ink that includes hollow sphere resins and no TiO$_2$.

Comparative Example 1

Water-Based PMS 213 Red Based on a blend of Anatase/Rutile TiO$_2$ White Pigments, with no hollow sphere inclusion. Comparative Example 1 exhibits a higher degree of wear than Inventive Example 1, due to the presence of the TiO$_2$ White Pigments.

Inventive Example 2

PMS 362 Green Based on a blend of Zinc Sulfide White Pigment and hollow sphere reins particles. Inventive Example 2 exhibits improved die-cutting blade wear when compared to Comparative Example 1.

TABLE 1

| Die-Cutting Blade Wear Test Results | | | | | |
|---|---|---|---|---|---|
| | Initial Disk Wt. (g) | Final Disk Wt. (g) | Δ Wt (mg) | Initial Viscosity (sec) | Calc. % wt. removal |
| Inventive Example 1 | 11.2397 | 11.2381 | 1.60 | 21.5 | 0.01% |
| Comparative Example 1 | 11.2351 | 11.1786 | 56.50 | 25 | 0.50% |
| Inventive Example 2 | 13.2656 | 13.2430 | 22.60 | 22 | 0.17% |

Initial viscosity was measured using a #2 EZ Efflux Cup. Initial viscosity is shown to be similar (±5 sec) among all examples, which removes viscosity as a possible variable in assessing die-cutting blade wear. It is preferred that the examples are tested at similar viscosity since large differences in viscosity (>5 sec) can lead to higher or lower heat during the die-cutting blade wear test and this can affect the results.

Comparative Example 2 and Examples 4-6

Comparative Example 2 is an opaque commercially available cascade white ink that is water-based and includes approximately 51.5 wt % $TiO_2$. Examples 4, 5, and 6 are versions of the Comparative Example 2 ink formulation modified to include varying amounts of Celocor® AF opaque polymer hollow sphere polymer resin. These compositions were tested for resistance to wear in the aforementioned die-cutting blade wear test (Table 2).

The four ink formulations were printed on Kraft substrate using a 200 Line/9.0 BCM anilox. Opacity and brightness for the printed materials were determined (Table 3). Opacity was measured using a Technidyne BNL-3 (3 measurements for an average) opacimeter. Brightness is determined by measuring with a X-rite Spectrodensitometer (3 measurements for an average)).

The ink formulations:

Comparative Example 2 (CE2)

100 wt % opaque commercially available cascade white ink that is water-based and includes approximately 51.5 wt % $TiO_2$;

Example 4

90 wt % CE2 formulation+10 wt % Celocor® AF;

Example 5

80 wt % CE2 formulation+20 wt % Celocor® AF; and

Example 6

70 wt % CE2 formulation+30 wt % Celocor® AF.

TABLE 2

| Composition | Initial Disk Weight (mg) | Final Disk Weight (mg) | Weight Loss of Disk (mg) |
| --- | --- | --- | --- |
| Comparative Example 2 | 13,606.4 | 13,428.5 | 177.9 |
| Example 4 | 12,469.6 | 12,342.7 | 126.9 |
| Example 5 | 13,419.4 | 13,326.5 | 92.9 |
| Example 6 | 13,306.0 | 13,225.7 | 80.3 |

TABLE 3

| Composition | Brightness | Opacity | Specific Gravity (lb./gal) |
| --- | --- | --- | --- |
| Comparative Example 2 | 40.7 | 54.2 | 14.31 |
| Example 4 | 47.5 | 58.5 | 13.19 |
| Example 5 | 47.8 | 59.6 | 12.51 |
| Example 6 | 48.4 | 59.8 | 11.78 |

Metal die-cutting blades are typically made of stainless or carbon steel that has a Mohs hardness of 4.0-4.5. The rutile form of titanium dioxide has a hardness of 6.0-6.5 and the anatase variety has a hardness of 5.5-6.0. Since the titanium dioxide has a hardness greater than the steel, it will scratch the steel blades. When done millions of times during the process of printing or die-cutting, the millions of scratches will eventually be observed as blade wear. By reducing or eliminating the amount of material in the ink that has a hardness greater than the steel, and replacing it with a softer material in the form of the hollow-sphere resin, erosion of the blade will be reduced.

Signature Mileage Testing:

In test runs, it has been found that ink formulations of the present disclosure in which some or all of the white pigment materials (e.g., $TiO_2$) in opaque water-based inks is replaced with hollow sphere resins (e.g., Celocor® AF resin), ink mileage is improved in comparison the inks containing only $TiO_2$.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A method of improving die cutting blade durability, comprising the steps of:
   providing an opaque ink comprising water as a volatile component and an opacifying component, wherein the opacifying component comprises 1.0 wt % to 100 wt % hollow sphere resin particles and 0 wt % to 90 wt % of a colorant that is one or more abrasive white pigments, on a solid weight basis of the opacifying component;
   printing the ink on a substrate; and
   cutting the printed substrate with a die cutting blade;
   wherein the durability of the die cutting blade is improved, relative to the durability of a die cutting blade used to cut a substrate printed with an ink comprising an opacifying component containing 100 wt % of a colorant that is abrasive white pigment, on a solid weight basis of the opacifying component.

2. The method of claim 1, wherein the abrasive white pigment is selected from titanium dioxide, zinc sulfide, and mixtures thereof.

3. The method of claim 1, wherein the printing ink further comprises an additional colorant selected from pigments and dyes that emit color in the visible, infrared, and ultraviolet spectrum, non-abrasive white pigments and dyes, and mixtures thereof.

4. The method of claim 3, wherein the additional colorant comprises pigments and dyes that emit color in the visible, infrared, and ultraviolet spectrum and does not include white pigments and dyes.

5. The method of claim 3, wherein the additional colorant comprises pigments and dyes that emit color in the visible spectrum.

6. The method of claim 3, wherein the additional colorant comprises pigments and dyes that emit color in the visible spectrum and does not include white pigments and dyes.

7. The method of claim 1, wherein the hollow sphere resin particles are voided latex particles.

8. The method of claim 1, wherein the hollow sphere resin particles are present in an amount from about 1.0 wt % to about 50 wt %, based on the total weight of the composition.

9. The method of claim 1, wherein the hollow sphere resin particles are provided as a hollow sphere resin component, wherein the hollow sphere resin component comprises hollow sphere resin particles dispersed in an aqueous solution in water, and the hollow sphere resin component is present in an amount from 10-90%, based on the total weight of the composition.

10. The method of claim 1, wherein about 10 wt % to about 100 wt % of the volatile component is water, based on the total weight of the volatile component.

11. The method of claim 1, further comprising a volatile component selected from alcohols, esters, aliphatic hydrocarbons, cyclic hydrocarbons, aromatic hydrocarbons, ketones, aldehydes, ethers, and mixtures thereof.

12. The method of claim 1, wherein the colorant comprises a pigment dispersion.

13. The method of claim 1, wherein the printing ink further comprises one or more waxes.

14. The method of claim 1, wherein the printing ink further comprises a crosslinker.

15. The method of claim 1, wherein the printing is performed by a printing method selected from flexographic and gravure printing.

* * * * *